GATED DC COUPLED J-K FLIP-FLOP
Filed Dec. 7, 1966
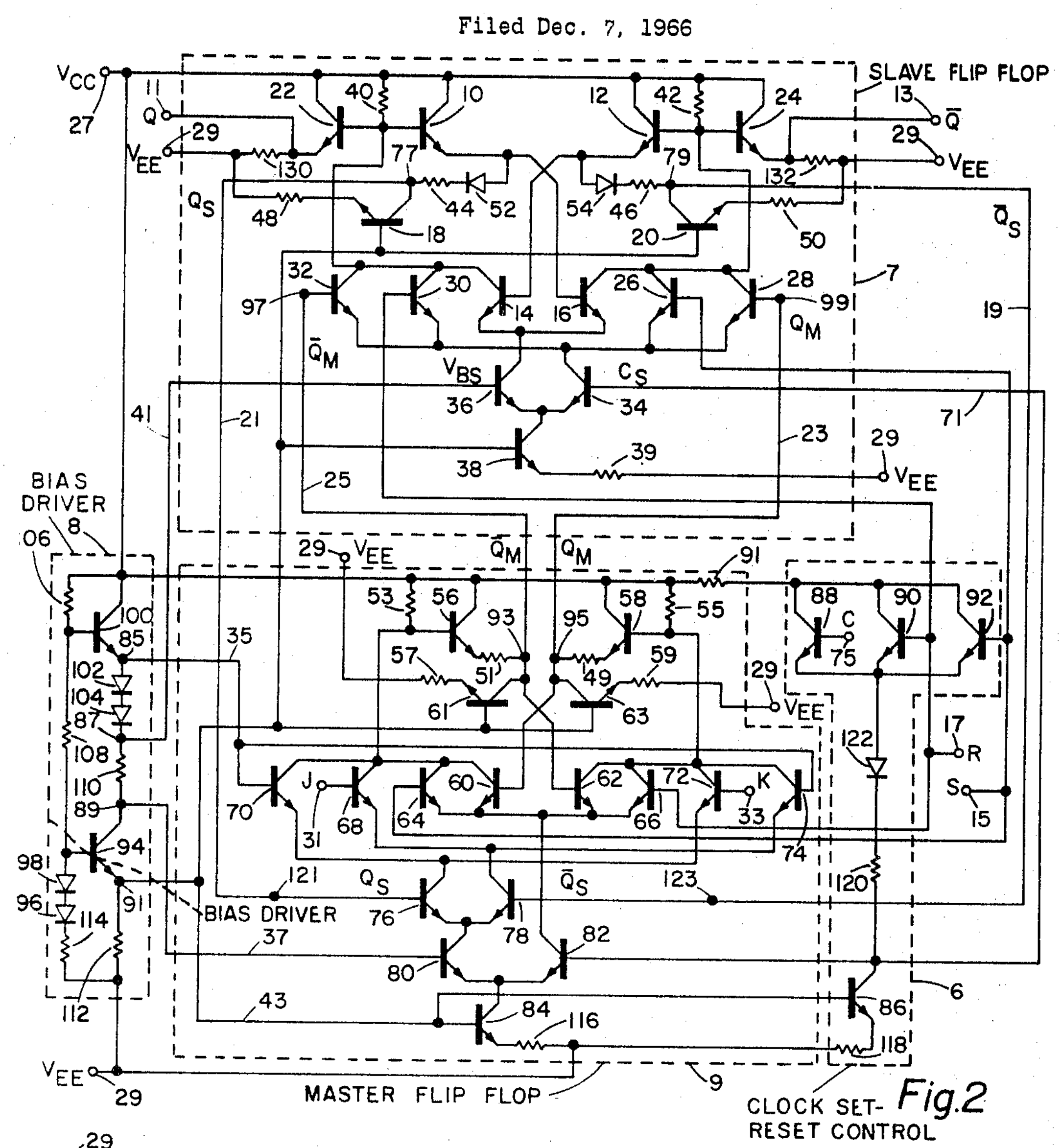
Fig.2
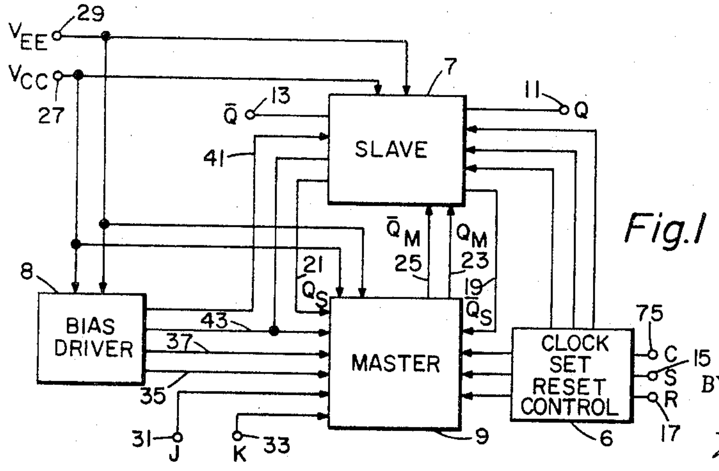
Fig.I
INVENTORS
Ury Priel
Walter C. Seelbach
Ronald L. Treadway
BY
Mueller, Aichele & Rauner
ATTY'S.

3,440,449

GATED DC COUPLED J–K FLIP-FLOP

Ury Priel, Phoenix, and Walter C. Seelbach and Ronald L. Treadway, Scottsdale, Ariz., assignors to Motorola, Inc., Franklin Park, Ill., a corporation of Illinois Filed Dec. 7, 1966, Ser. No. 599,948
Int. Cl. H03k *3/286*
U.S. Cl. 307—291 16 Claims This invention relates generally to bistable flip-flops for any binary logic input signal condition. These flip-flops are known in the computer art as J–K flip-flops, and the J–K function provided by these flip-flops is that of insuring that the flip-flop will have a determinate state when two identical binary switching signals at voltage levels sufficiently high to change the state of the flip-flops are simultaneously applied to separate J and K inputs of the flip-flop. More particularly, this invention is directed to a new master-slave implementation of the J–K bistable function utilizing improved high speed current mode clocking control to prevent signal racing within the flip-flops.

Prior art J–K flip-flops normally utilize capacitance storage or storage effects of transistors or other semiconductor devices to control the J–K function. However, in flip-flop circuits having either of these storage means, the maximum frequency of operation is limited by the inherent delay problems caused by the time response in charge storage elements.

Accordingly, it is an object of this invention to provide a new J–K master-slave flip-flop which does not require capacitance or other charge storage elements to provide the J–K function.

Another object of this invention is to provide a new J–K flip-flop which is not plagued by problems of signal racing.

Another object of this invention is to provide a J–K flip-flop which may be DC set and reset independently of J and K input information and controlled independently of clock signals applied thereto.

Another object of this invention is to provide a new and improved high speed J–K flip-flop operative in the current mode to extend the frequency range of known J–K flip-flops.

A further object of this invention is to provide new and improved bias driving circuitry particularly adapted to supply the required biasing levels at various points within the master-slave circuitry and simultaneously exhibit excellent temperature tracking.

A feature of this invention is the provision of a new J–K flip-flop including a series parallel current-mode clocking scheme in combination with master and slave bistable circuit portions and which is operative at high speeds and a low power dissipation.

Another feature of this invention is the provision of a master-slave J–K flip-flop having master and slave portions which are alternately enabled and locked in a previous conductive state as clock signals applied to the flip-flop alternate between first and second predetermined logical levels. Thus, information which is shifted into one of the master or slave portions of the flip-flop when the clock signals are at one predetermined logical level may be thereafter shifted into the other of the master or slave portions of the flip-flop when the clock signals are shifted to a second predetermined logical level. In the circuit arrangement according to this invention, first and second control terminals in the slave portion of the flip-flop are returned to the master portion of the flip-flop to control the admission of J and K information applied to the master portion of the flip-flop.

The present invention also features a transistorized, differentially connected clocking circuit connected within the master and slave portions of the flip-flop and which is connectable to a source of clock, set and reset signals. Part of this clocking circuitry may be considered a part of the master and slave flip-flop portions since the differential connection of transistors therein produces a bistable switching action of the type present in each of the basic internal bistable elements of the master and slave portions of the flip-flop. When the clock is at a first predetermined logical level, the slave flip-flop portion may be freely switched from one to the other of its two conductive states and the master portion of the flip-flop is locked in its previous conductive state. When the clock signals are shifted to a second predetermined logical level, the slave portion of the flip-flop becomes fixed in its previous conductive state, which is effective to control the shifting of J and K binary information into the master portion of the flip-flop when the clock is at a second predetermined logical level. After the J and K binary information is shifted into the master portion of the flip-flop and the clock signals returned to the first predetermined logical level, the master flip-flop portion information is thereafter shifted into the slave portion of the flip-flop and produces binary output signals at the slave portion of the flip-flop. The first and second control terminals of the slave flip-flop portion are differentially connected to a pair of master control transistors in a circuit configuration that insures that toggling will occur when binary ONE logical information (using positive logic) is applied to the J and K input terminals of the flip-flop. These master control transistors will alternately conduct as toggling occurs in the flip-flop.

The present invention further features a master-slave transistor control unit which is connected to both the master and slave portions of the flip-flop and provides an overall clocking control and asynchronous set-reset capability for the J–K flip-flop. When an outside source of clocking signals is connected to the clocking transistor and this transistor is biased into and out of conduction as the clock alternates between high and low logical levels, the conductive state of the J–K flip-flop may be controlled by J and K input information. At the same time, however, since set and reset transistors are connected in parallel with the clocking transistor, set or reset signals applied to these transistors respectively are capable of asynchronously controlling the conductive state of the J–K flip-flop independently of the level of the clock.

In the drawing:

FIG. 1 is a block diagram of the J–K flip-flop according to this invention; and

FIG. 2 is a schematic diagram of the J–K master-slave flip-flop circuitry including the novel bias driving arrangement referred to above.

Briefly, the DC coupled J–K flip-flop according to this invention includes a slave bistable flip-flop portion having a basic internal bistable switching element and first and second inputs DC coupled thereto for receiving binary logic information capable of changing the conductive state of the flip-flop. The slave flip-flop portion further includes first and second control terminals which alternately exist at high and low logical levels, depending upon the conductive state of the flip-flop. Further included in the J–K flip-flop is a master bistable flip-flop portion also having a basic internal bistable switching element and first and second input terminals DC coupled thereto; these last-named first and second input terminals are connected respectively to the first and second control terminals of the slave portion of the flip-flop for receiving therefrom binary information for controlling the conductive state of the master bistable flip-flop portion. The master bistable flip-flop portion has first and second output terminals which are connected respectively to the first and second input terminals of the slave portion of the flip-flop, and these last-named output terminals also exist alternately at high and low logical levels depending upon the conductive state of the master portion of the flip-flop. Novel clocking circuitry including differentially connected transistors in the master and slave flip-flop portions provide the clocking and set-reset control for the J–K flip-flop upon the application of clock or set and reset signals to the circuit. Actually, part of the clocking circuitry can be considered not within the master and slave flip-flop portions, and this clocking circuitry will be refered to as "master-slave" clocking circuitry since it simultaneously provides positive control for both the master and slave portions of the flip-flop. When the clock C is at one of two possible binary logical levels, the master portion of the flip-flop is fixed in its previous conductive state and the slave portion of the flip-flop is enabled to be freely changed from one to the other of its two possible conductive states. When the clock shifts to the other of its two possible binary logical levels, the conductive state of the slave flip-flop portion becomes fixed and the conductive state of the master portion of the flip-flop may be changed by the application of J and K binary information thereto.

The clocking circuitry further includes first and second master control transistors which are connected to first and second control terminals of the slave portion of the flip-flop. These master control transistors insure that when $J=K=$ONE (using positive logic) and with a certain periodic clocking of the flip-flop, toggling will occur and the conductive state of the flip-flop will, by definition, always be determinate.

Referring in more detail to the block diagram of FIG. 1 and the corresponding schematic diagram of FIG. 2, the block diagram in FIG. 1 will be initially described generally in terms of master-slave function, and this function will be later described in greater detail with reference to the schematic diagram of FIG. 2.

The master-slave flip-flop is represented functionally in FIG. 1 by a master portion 9 and a slave portion 7, and each of these portions is connected to the Q and $\overline{Q}$ outputs of the other. The $Q_s$ and $\overline{Q}_s$ master control outputs of the slave flip-flop portion are connected via lines 19 and 21 to the inputs of the master portion 9 of the flip-flop and the $Q_m$ and $\overline{Q}_m$ outputs of the master flip-flop portion are connected at lines 23 and 25 to a pair of inputs of the slave portion 7.

Both the master and slave portions of the flip-flop are connected to a common or main input clocking and set-reset control network 6. Network 6 is in turn connectable to sources of clock, set and reset signals at terminals 75, 15 and 17 respectively. As will be more fully explained in the following detailed description of FIG. 2, the conductive state of the J–K flip-flop may be altered by clock signals applied at terminal 75 or set and reset signals asynchronously applied to terminals 15 and 17. The master portion of the flip-flop further includes J and K input terminals 31 and 33 connectable to sources of J and K binary input information.

A bias driver network 8 has four output lines 35, 37, 43 and 41 connected as shown for providing the proper bias levels in the master and slave portions of the flip-flop, and the bias driver 8 will be described in further detail with reference to FIG. 2. The bias driver 8 and the master and slave portions 9 and 7 of the J–K flip-flop are all connected to receive collector and emitter biasing potentials $V_{CC}$ and $V_{EE}$ via lines 27 and 29 as shown.

The master and slave portions 9 and 7 respectively of the flip-flop are connected in such a manner that when the clock is high the master portion will remain in a fixed conductive state with $Q_m$ and $\overline{Q}_m$ being at fixed binary logical levels. When the clock is high the slave portion 7 of the flip-flop is conditioned to be switched alternately between its two stable states without having any effect whatsoever on the master portion of the flip-flop. However, when the clock comes down, the reference voltage from the bias driver controls the slave portion 7 of the flip-flop, locking it in its previous conductive state and the master portion 9 of the flip-flop is now enabled for its bistable switching action. Depending upon whether $Q_s$ or $\overline{Q}_s$ is at a high logical level, either J or K binary input information applied to lines 31 and 33 will be shifted into the master portion 9 of the flip-flop to either change the conductive state thereof or to maintain the master portion in its previous conductive state. However, upon the concurrent application of binary logical ONE's (using positive logic) to input terminals 31 and 33, the master portion of the flip-flop will always be changed from its previous conductive state when $J=K=$ONE, flip-flop will toggle back and forth between its two conductive states during periodic clocking.

Regarding the terminology used to define the voltage levels at various points within the circuit, the terms "binary ONE" and "binary ZERO" are frequently used to denote a particular voltage level at a given point within a logic circuit, such as the flip-flop described herein. However, since all of the points within the circuit will always exist at either one or the other of two possible voltage levels and since the various biasing schemes showing in FIG. 2 and including resistors, diodes, transistors, etc., shift the voltage levels from point to point within the circuit, the terms "high" and "low" will be used to describe the two possible voltage levels at various points within the circuit. The terms "high" and "low" are to be distinguished from "binary ONE's" and "binary ZERO's" because the latter terms are most generally used to define voltage levels at the inputs and outputs of a particular logic circuit rather than at various points within the internal circuit. It is believed that this distinction will help to properly identify the various different voltage levels within the circuit due to the particular biasing and level shifting elements therein.

The exact operation of the master-slave J–K flip-flop according to this invention will become more fully apparent from the following description of FIG. 2 which includes an integrated circuit having a transistorized emitter-coupled bistable slave flip-flop portion 7 with a pair of the emitter-follower transistors 10 and 12 symmetrically cross-coupled to a pair of holding or latch-back transistors 14 and 16 in a circuit configuration wherein either holding transistor 14 or holding transistor 16 is conductive in one and the other of the two stable states of the slave flip-flop portion 7.

The emitter-follower transistors 10 and 12 which are cross-coupled to the holding transistors 14 and 16 form a basic internal bistable switching element of the slave portion of the flip-flop. The specific bistable switching operation of this four-transistor internal bistable switching circuit is well known to those skilled in the art of computer logic. The holding transistor 14 or 16 with the highest base potential is conducting under static voltage conditions within the circuit, and the emitter-follower transistor 10 or 12 with the highest base potential will of course be one base emitter voltage drop ($V_{BE}$) above the base potential of the conducting holding transistor. When the state of the basic four-transistor bistable element changes, the previously conducting holding transistor 14 or 16 is biased non-conducting and the previously non-conducting holding transistor 14 or 16 is biased into conduction.

A pair of constant current transistors 18 and 20 are interconnected through diodes 52 and 54 to the multivibrator cross-coupling scheme, and a pair of output transistors 22 and 24 are connected to resistors 40 and 42 in order to provide the flip-flop with improved emitter-follower output drive capability.

Two groups of emitter-coupled transistors are shown. The first group consists of transistors 26, 28, 30 and 32 and the second group consists of transistors 14 and 16. One transistor in each group is conducting for each stable state of the flip-flop, and the conducting transistor in each group will have the highest base potential of all of the transistors in that group. When the clock is high and the slave clocking transistor 34 is conducting, one of the transistors of the first group will conduct. If the clock is low and the slave reference transistors 36 is conducting, one of the transistors 14 or 16 in the second group will conduct and maintain the flip-flop in its previous state. A current sink transistor 38 provides a constant current path between transistors 34 and 36 in the slave flip-flop portion and the common output resistor 39.

A more complete description of operation of the innermost circuitry of the master and slave flip-flop portions 9 and 7 respectively may be found in copending application Ser. No. 363,959, now Patent No. 3,317,750, of Jan A. Narud et al. and assigned to the assignee of this application. Similar basic internal bistable flip-flop circuitry is also described in copending application Ser. No. 584,039 of Ury Priel et al., also assigned to the assignee of this application. A further description of the transistor switching operation of the slave portion 7 of the J–K flip-flop will be described below with reference to the overall switching operation of the DC J–K master-slave system.

The master portion 9 of the J–K flip-flop contains circuit portions thereof which function similarly to the bistable switching circuitry in the slave portion 7 of the flip-flop. For example, the master portion of the J–K flip-flop includes emitter-follower transistors 56 and 58 symmetrically cross-coupled to holding or latch-back transistors 60 and 62 in a basic internal bistable circuit configuration. Additional set and reset transistors 64 and 66 are emitter-coupled to the holding transistors 60 and 62 respectively, and these set and reset transistors may be conductively controlled by set and reset signals and thereby asynchronously control the J–K flip-flop. This asynchronous control will be further described with reference to the description of the overall master-slave switching operation. The master portion of the flip-flop further includes a pair of constant current source transistors 61 and 63 connected respectively to the emitter resistors 51 and 49 of the emitter-follower transistors 56 and 58. The emitter resistors 49 and 51 shift the DC levels at the bases of holding transistors 60 and 62 to a value that will enable the set and reset transistors 64 and 66 to override these holding transistors when set and reset signals are applied at terminals 15 and 17. This level shifting scheme enables the input set and reset signals S and R to asynchronously control the conductive state of the J–K flip-flop. The J and K input transistors 68 and 72 are respectively coupled to the collectors of master control transistors 78 and 76.

The first and second master control transistors 76 and 78 are referred to as "control transistors" since the bases of these transistors are connected via feedback lines to first and second control points or terminals 77 and 79 in the slave portion 7 of the J–K flip-flop. If point 77 is high and point 79 is low, then master control transistor 76 will override master control transistor 78 and enable K binary information to enter. On the other hand, if the output point or terminal 79 is high and point 77 is low, then transistor 78 will conduct and enable J binary information to conductively control the state of the master flip-flop porion 9. Transistors 78 and 76 enable the master portion 9 of the flip-flop to change its state when clock signals applied to the base of the master-slave clocking transistor 88 go low and enable the master reference transistor 80 to override the master clocking transistor and complete a current path from one of the master control transistors 76 or 78 to the current sink transistor 84 and through resistor 116.

A bias driver circuit 8 is connected between the collector supply $V_{CC}$ at terminal 27 and the emitter supply $V_{EE}$ at terminal 29. This circuit includes four points 85, 87, 89 and 91 of reference potential intermediate the collector potential $V_{CC}$ and the emitter potential $V_{EE}$. The bias driver circuit 8 includes a first transistor 100 serially connected through diodes 102 and 104 and resistor 110 to a second or current sink transistor 94, the latter being resistively coupled to potential $V_{EE}$ through resistor 112. A pair of temperature stabilizing diodes 96 and 98 is connected as shown in the base-emitter circuit of current sink transistor 94, and a resistor 114 connects diodes 96 and 98 to the emitter potential $V_{EE}$. The bases of transistors 94 and 100 are resistively interconnected by resistor 108, and transistor 100 has a collector-base bias resistor 106 connected thereto.

The first point 85 of intermediate potential at the emitter of transistor 100 is connected to the bases of the second and third master reference transistors 74 and 70 for biasing these transistors into conduction as long as the reference potential at the first point 85 exceeds the potential of the binary J and K information applied to the J and K input transistors 68 and 72. Point 87 which is two diode drops or $2V_{BE}$ below point 85 is connected to the base of the slave reference transistor 36, and point 89 which is at a potential slightly lower than point 87 is connected to the base of the master reference transistor 80. Therefore, it can be seen that with the reference potential at the master reference transistor 80 s'ightly lower than the reference potential at the slave reference transistor 36, clock signals applied simultaneously to the slave and master clocking transistors 34 and 82 will bias clocking transistor 82 into conduction and override master reference transistor 80 prior to biasing the clave clocking transistor 34 into conduction and overriding the slave reference transistor 36. This biasing arrangement insures that the $\overline{Q}_m$ and $Q_m$ information is fixed before it is shifted into the slave portion of the flip-flop 7.

The point 91 at the emitter of current sink transistor 94 in the bias driver 8 is connected to current sink transistors 18 and 20 in the slave portion of the flip-flop, current sink transistors 61 and 63 in the master portion of the flip-flop and current sink transistors 38 and 84 in the slave and master portions of the flip-flop, respectively. The latter current sink transistors are at the base of the tree-like transistor arrangements in the slave and master portions of the flip-flop.

The bias driver 8 provides the master and slave portions of the flip-flop with fixed bias potentials which are required for proper circuit operation and eliminates the need for additional power supplies between the $V_{CC}$ and $V_{EE}$ levels. The bias driver network 8 additionally provides good tracking of the reference voltages with varying input midswing logic potentials and thus improves the noise immunity properties of the flip-flop under variations of ambient temperature and power supply levels.

The remaining transistors in the master portion 9 of the flip-flop which are not mentioned above will be specifically referred to in the following description of operation of the master-slave system, and from this description of operation the exact function performed by each of the transistors in the master-slave system will be appreciated.

DESCRIPTION OF OPERATION

Assume that using positive logic and for purposes of illustration the clock is high and that a clock signal C is applied to the base of the master-slave clocking transistor 88 in the master-slave control portion 6 of the flip-flop. This signal biases transistor 88 into conduction and produces a corresponding increase in voltage level at the collector of the current sink transistor 86. This voltage transition biases the master clocking transistor 82 in the master portion 9 of the flip-flop into conduction. The slave clocking transistor 34 in the slave portion of the flip-flop is also biased into conduction since the base thereof is directly connected via line 71 to the collector of current sink transistor 86. For these assumed conditions, the slave clocking transistor 34 will override the slave reference transistor 36 in the slave portion 7 of the J–K flip-flop, and the conductive state of the slave portion 7 of the flip-flop may be alternately switched back and forth between its two stable states. During this switching action, the Q and $\overline{Q}$ outputs at first and second output terminals 11 and 13 respectively alternate between logical ONE's and logical ZERO's. However, such alternation in conductive states of the slave portion 7 of the J–K flip-flop has no affect whatsoever on the master portion 9 of the flip-flop as long as the clocking transistor 82 therein is conducting, and thereby holding the master portion 9 of the J–K flip-flop in a fixed state irrespective of the levels of the $\overline{Q}_s$ and $Q_s$ control signals applied to the first and second control terminals 121 and 123 respectively at the bases of master control transistors 76 and 78. For example, set and reset DC input signals may be applied to the master-slave set and reset switching transistors 92 and 90 in order to change the conductive state of the slave portion 7 of the J–K flip-flop. Note that the master-slave set and reset transistors 92 and 90 are coupled to the base of set and reset transistors 26 and 30 in the slave portion 7 of the J–K flip-flop. However, as long as the clock C is high, the clocking transistor 82 will conduct, and a change in the conductive state of the slave portion 7 of the J–K flip-flop will not change the conductive state of the master portion 9 of the J–K flip-flop. The master-slave clocking set and reset transistors 88, 92 and 90 are connected in parallel with each other and in series with diode 122, resistor 120 and a current sink consisting of current sink transistor 86 and resistor 118. These semiconductor components represented by functional block 6 may be considered as an overall master-slave control unit which simultaneously controls the conductivity of the master and slave portions of the flip-flop.

Assume now that the clock C goes low and that immediately prior thereto $\overline{Q}_s$ is high and that $Q_s$ is low. When the clock C goes low the master reference transistor 80 in the master portion 9 of the flip-flop will override the master clocking transistor 82 and provide a conductive path from one of the master control transistors 76 and 78 into the current sink transistor 84. Assuming that $\overline{Q}_s$ is high, the master control transistor 78 will conduct and enable conduction in either the J input transistor 68 or the second master reference transistor 74 which is connected at point 85 to the emitter of bias driver transistor 100. If the binary input level at the base of the J input transistor 68 is high at a logical ONE level, then the J input transistor 68 will override the second master reference transistor 74 and conduct, pulling the base of the emitter-follower transistor 56 low and also pulling $\overline{Q}_m$ at the base of follower resistor 51 low. If the binary information at the J input to transistor 68 is at a logical ZERO level, then the second master reference transistor 74 will conduct and the base of emitter-follower transistor 58 and $Q_m$ will be pulled low.

Since a J–K flip-flop is, by definition, one that has no indeterminate state and one that will always undergo a change in conductive state upon the simultaneous application of binary ONE's (using positive logic) to the J and K inputs thereof, then for purposes of illustrating J–K flip-flop action according to this invention, assume that binary ONE's are simultaneously applied to J and K input transistors 68 and 72 and that $\overline{Q}_s$ is high. When the clock C goes low transistor 68 will conduct and the base of emitter-follower transistor 56 will be pulled low, dropping $\overline{Q}_m$ at master output terminal 93 (the collector of current sink transistor 61) to a low logical level. Therefore, with conduction in the K input transistor 72 inhibited and with the second master reference transistor 74 overridden by the J input transistor 68, then neither the K input transistor 72 nor the second master reference transistor 74 can conduct, and $Q_m$ at the master output terminal 95 (the collector of current sink transistor 63) is high. Thus, the condition in the slave portion 7 of the J–K flip-flop is that the base of the emitter-coupled transistor 32 is low, being connected to a first slave input terminal 97 via line 25 from the master portion 9 of the J–K flip-flop. The base of the emitter-coupled transistor 28 is high, being connected at a second slave input terminal 99 via line 23 to the master portion 9 of the J–K flip-flop.

At this point in the switching operation of the master-slave J–K flip-flop, with the clock C low and the slave reference transistor 36 overriding the slave clocking transistor 34, the slave portion 7 of the flip-flop is maintained in a fixed conductive state. This conductive state is that to which the slave portion 7 of the J–K flip-flop was switched immediately prior to the time that the clock C was shifted to low level.

If now the clock C shifts again to a high logical level and the master-slave clocking transistor 88 is biased into conduction by a binary ONE logical signal applied to the base thereof, then the slave clocking transistor 34 will likewise be biased into conduction a finite time after transistor 82 conducts, and the conductive state of the master portion 9 of the J–K flip-flop will now be shifted into the slave portion 7 of the J–K flip-flop.

With the slave clocking transistor 34 conducting and with the base of the emitter-coupled transistor 28 in the slave portion 7 of the flip-flop high and transistor 28 conducting, the base of emitter-follower 12 is pulled down and this voltage level is followed by $\overline{Q}_s$ at the collector of the current sink transistor 20. At the same time, with emitter-coupled transistor 32 non-conducting the state of the slave portion 7 of the J–K flip-flop is changed and $Q_s$ goes high, following the emitter of emitter-follower transistor 10. The emitter-coupled transistors 28 and 32 in the salve portion 7 of the flip-flop may be considered as slave control transistors, just as the emitter-coupled transistor 10. The emitter-coupled transistors 28 and 32 were considered as master control transistors. The master control transistor 76 and 78 are controlled by the repective $Q_s$ and $\overline{Q}_s$ voltage levels at points 77 and 79 in the slave portion of the flip-flop whereas the slave control transistors 32 and 28 are controlled by the voltage levels $\overline{Q}_m$ and $Q_m$ at output terminals 93 and 95 in the master portion of the flip-flop.

From the following description it is seen that upon the simultaneous application of binary J and K information at the logical ONE level to J and K input transistors 68 and 72, the conductive state of the slave portion 7 of the J–K flip-flop will always change during the application of periodic clock signals to the flip-flop. Furthermore, it is also clear that in the switching example described above if J and K binary ONE's are subsequently applied to the J and K input transistors 68 and 72 respectively after $\overline{Q}_s$ has been switched from a high logical level to a low logical level and $Q_s$ has been switched from a low logical level to a high logical level, then the K binary ONE applied to the base of the K input transistor 72 will control, pulling $Q_m$ at the output terminal 95 down. This switching action will establish a high level of logic for $\overline{Q}_m$ at the base of emitter-coupled slave control transistor 32 and a low level of logic at the base of emitter-coupled slave control transistor 28. Thus, when the clock C again shifts to a high level of logic, transistor 32 will override the holding transistor 16 in the slave portion 7 of the flip-flop, pulling point 77 at the collector of current sink transistor 18 low and concurrently switching point 79 at the collector of current sink transistor 20 high. This bistable switching action returns $\overline{Q}_s$ to a high logical level and $Q_s$ to a low logical level.

The above-described operation is referred to as toggling, and as long as the clock C is periodically switched from a high level of logic to a low level with $J=K=1$, then Q and $\overline{Q}$ at the outputs of emitter-follower buffer transistors 22 and 24 will be alternately switched from a high binary level of logic to a low binary level of logic.

The following is a truth table for the clocked J–K operation of the flip-flop according to this invention. This table illustrates the conductive states of the Q output at one of the output terminals 11 or 13 for eight different conditions of the J–K and clock information.

TRUTH TABLE OF A CLOCKED J-K FF

| Condition | $K_n$ | $J_n$ | $C_n$ | $Q_{n+1}$ |
|---|---|---|---|---|
| 1 | 0 | 0 | 0 | $Q_n$ |
| 2 | 1 | 0 | 0 | $Q_n$ |
| 3 | 0 | 1 | 0 | $Q_n$ |
| 4 | 1 | 1 | 0 | $Q_n$ |
| 5 | 0 | 0 | 1 | $Q_n$ |
| 6 | 1 | 0 | 1 | 0 |
| 7 | 0 | 1 | 1 | 1 |
| 8 | 1 | 1 | 1 | $\overline{Q}_n$ |

For the first four conditions with the clock down, it will be observed that the logical Q output level at time bit $n+1$ is unchanged and exists at the same level at which it was during the pervious time bit $n$. For condition five with J and K information both at logical ZERO (using positive logic) again there is no change in the output of the flip-flop at time bit $n+1$. However, with the clock high in conditions six and seven and with $K_n$ and $J_n$ alternately shifting to a binary ONE logical level, then the Q outputs of the flip-flop will alternate from a logical ZERO to a logical ONE level. Then, for condition either with binary ONE's applied to the J and K input transistors and with the clock also high at a logical ONE level, the flip-flop output which previously was represented by $Q_n$ will now be shifted to $\overline{Q}_n$ as described above.

The following table of values is given only by way of illustration and should not be construed as limiting the scope of this invention.

*Table*

| Resistors: | Value, ohms |
|---|---|
| **R39** | 50 |
| **R40** | 100 |
| **R42** | 100 |
| **R44** | 240 |
| **R46** | 240 |
| **R48** | 244 |
| **R49** | 176 |
| **R50** | 244 |
| **R51** | 176 |
| **R53** | 100 |
| **R55** | 100 |
| **R57** | 244 |
| **R59** | 244 |
| **R91** | 50 |
| **R106** | 263 |
| **R108** | 1340 |
| **R110** | 95 |
| **R112** | 805 |
| **R114** | 253 |
| **R116** | 100 |
| **R118** | 244 |
| **R120** | 42 |
| **R130** | 500 |
| **R132** | 500 |

An important feature of this invention and mentioned briefly above resides in the fact that the master bistable flip flop portion 9 is latched out only when the clock is high. Assume for example that $Q_s$ is low, $\overline{Q}_s$ is high and that the clock C is low. For this assumed condition transistor 76 will be off and transistor 78 will be conducting. The J input which is differentially complemented in the emitter-coupled pair of transistors 68 and 74 may freely control the master flip-flop portion 9, and transistors 60, 62, 64, 66, 70, 72 and 82 will all be non-conductive. Assuming that the J input is high or at a binary ONE level, then transistor 68 will be conducting, transistor 74 will be non-conducting, $\overline{Q}_m$ at output point 93 will be low and $Q_m$ at output point 95 will be high. If now the clock rises to its high state, current will flow through transistors 60 and 82, and the master section 9 of the flip-flop will be locked to the state to which it was switched by the J binary information applied at terminal 31 immediately prior to the clock going to its high state; i.e., $Q_m$ will be high and transistors 58, 60, 82 and 84 will be conducting. The important feature to be stressed here is that the clock transition transfers the captured J or K information which was shifted into the master section 9 into the slave flip-flop section 7, and this is accomplished by operating output points 93 and 95 differentially in the emitter coupled transistor path 32 and 28 as shown. The mode in which or frequency at which the master flip-flop portion 9 was switched while the clock was low affects the state of the slave section 7 only by transferring the information last stored in the master flip-flop portion 9 immediately prior to the clock going high. This feature can be expressed in truth table form in the following manner:

TRUTH TABLE OF $Q_n+1=J\overline{Q}_n+\overline{K}Q_n$

| J | K | $Q_n$ | $Q_n+1$ |
|---|---|---|---|
| 0 | X | 0 | 0 |
| 1 | X | 0 | 1 |
| 0 | X | 0 | 0 |
| 1 | X | 0 | 1 |
| X | 0 | 1 | 1 |
| X | 0 | 1 | 1 |
| X | 1 | 1 | 0 |
| X | 1 | 1 | 0 |

X=doesn't matter.

We claim:

1. A DC coupled J–K flip-flop including in combination:

(a) a slave bistable flip-flop portion having an internal bistable switching element and first and second inputs coupled thereto for receiving binary logic information capable of changing the conductive state of the flip-flop, said slave flip-flop portion further including first and second control terminals which alternately exist at high and low logical levels depending upon the conductive state of the flip-flop, (b) a master bistable flip-flop portion having an internal bistable switching element and first and second input terminals coupled thereto, said last named first and second input terminals also connected respectively to the first and second control terminals of the slave portion of the flip-flop for receiving therefrom binary logic information for controlling the conductive state of the master bistable flip-flop portion, said master bistable flip-flop portion further having first and second output terminals which are connected respectively to said first and second input terminals of the slave portion of the flip-flop and which exist alternately at high and low logical levels depending upon the conductive state of the master portion of the flip-flop, and (c) clocking means coupled to the internal bistable switching elements of the slave and master flip-flop portions and connectable to a source of clock signals for holding said master portion of the flip-flop in a fixed conductive state and for enabling the conductive state of the slave portion of the flip-flop to be freely changed by binary signals applied thereto when clock signals are at a first predetermined logical level, said clocking means enabling the binary logic levels at the first and second control terminals of the slave portion of the flip-flop to control the conductive state of the master portion of the flip-flop only when clock signals applied thereto are shifted to a second predetermined logical level, said clocking means holding said slave portion of said flip-flop in a fixed conductive state and simultaneously enabling J and K binary information to be shifted into the master portion of the flip-flop and change the conductive state thereof when said clock signals are at said second predetermined logical level, said binary logical levels existing at the first and second output terminals of the master portion of the flip-flop thereafter being shifted into the slave portion of said flip-flop to change the conductive state thereof when said clock signals return to said first predetermined logical level.

2. The flip-flop according to claim 1 which further includes:
(a) first and second output terminals connected to the slave portion of the flip-flop for providing a logic drive capability for said flip-flop, said first and second output terminals existing alternately at high and low binary logical levels, and
(b) set-reset asynchronous control means connected to said master and slave portions of the flip-flop for controlling the conductive state of the master and slave portions of the flip-flop independently of the level of said clock signals.

3. The flip-flop according to claim 1 wherein:
(a) said clocking means includes a slave clocking transistors means connected within the slave portion of the flip-flop and biased conductive when said clock signals are at said first predetermined logical level for enabling the state of the slave portion of the flip-flop to be freely changed, said slave clocking transistor means biased non-conductive when said clock signals shift to said second predetermined logical level and thereby no longer enable the state of the slave portion of the flip-flop to be changed; and
(b) said clocking means further including a master clocking transistor means connected within the master portion of the flip-flop and biased conductive when said clock signals are at said first predetermined logical level for locking the master portion of the flip-flop in the previous conductive state thereof, said master clocking transistor means biased non-conductive when said clock signals shift to said second predetermined logical level and permitting the master portion of the flip-flop to be gated from one to the other of its two stable states by J and K binary input information applied thereto, the change of conductive state of the master portion of the flip-flop which occurs when said clock signals are at said second predetermined logical level being shifted into the slave portion of the flip-flop only when said clock signals return to said first predetermined logical level and bias said slave clocking transistor means into conduction.

4. The flip-flop according to claim 3 wherein said slave clocking transistor means is differentially connected to a slave reference transistor means and overrides said slave reference transistor means to enable the state of the slave portion of the flip-flop to be freely changed when said clock signals are at said first predetermined logical level, said slave clocking transistor means being overridden by said slave reference transistor means when said clock signals are shifted to said second predetermined logical level.

5. The flip-flop according to claim 3 wherein said master clocking transistor means is differentially connected to a master reference transistor means, said master clocking transistor means being biased into conduction to hold the master portion of the flip-flop in its previous conductive state when said clock signals are at said first predetermined logical level and being overridden by said master reference transistor means when said clock signal shifts to said second predetermined logical level and thereby enables the conductive state of the master portion of the flip-flop to be changed by J and K binary logic signals applied thereto.

6. The flip-flop according to claim 5 wherein said slave clocking transistor means is differentially connected to a slave reference transistor means and overrides said slave reference transistor means to enable the state of the slave portion of the flip-flop to be freely changed when said clock signals are at said first predetermined logical level; said slave clocking transistor means being overridden by said slave reference transistor means when said clock signals are shifted to said second predetermined logical level.

7. The flip-flop according to claim 6 wherein:
(a) said clocking means further includes a first master control transistor means connected between said master reference transistor means and the internal bistable element of the master portion of the flip-flop, said first master control transistor means enabling K binary information applied to the master portion of the flip-flop to change the conductive state thereof when said first master control transistor means is conducting, and
(b) a second master control transistor means differentially connected to said first master control transistor means and also connected between said master reference transistor means and the internal bistable element of the master portion of the flip-flop, said second master control transistor means enabling J binary information applied to the master portion of the flip-flop to change the conductive state thereof when said second master control transistor means is conducting, said first master control transistor means further connected to said first control terminal of the slave portion of the flip-flop and controlled by the voltage level thereat, said second master control transistor means further connected to said second control terminal of the slave portion of the flip-flop and controlled by the voltage level thereat, one of said first and second master control transistor means being enabled for conduction when said master reference transistor means is overriding said master clocking transistor means.

8. The flip-flop according to claim 7 wherein:
(a) said clocking means further includes a second master reference transistor means and a K input transistor means differentially connected between the internal bistable element of the master portion of the flip-flop and said first master control transistor means, the one of said second reference transistor means and said K input transistor means with the highest potential applied thereto being biased into conduction when said first master control transistor means is conducting, and
(b) a third master reference transistor means and a J input transistor means differentially connected between the internal bistable element of the master portion of the flip-flop and said second master control transistor means, the one of said third master reference transistor means and said J input transistor means with the highest potential applied thereto becoming conductive when said second master control transistor means is conducting.

9. A DC coupled J–K flip-flop including in combination:
(a) a slave bistable flip-flop portion having first and second input terminals for receiving binary logic information capable of changing the conductive state of the flip-flop, said slave flip-flop portion further including first and second control terminals which alternately exist at high and low logical potential levels depending upon the conductive state of the flip-flop: said slave flip-flop portion including a basic internal bistable element consisting of first and second emitter-follower transistors cross-coupled respectively to first and second holding transistors in a circuit configuration wherein only one of said holding transistors is conducting under static conditions within said J–K flip-flop,
(b) a master bistable flip-flop portion having first and second input terminals connected respectively to the first and second control terminals of the slave portion of the flip-flop for receiving therefrom binary logic information capable of controlling the conductive state of the master flip-flop portion, said master flip-flop portion further having first and second output terminals connected respectively to said first and second input terminals of the slave portion of the flip-flop and which exist alternately at high and low logical levels as the master portion of the flip-flop is switched from one to the other of its two conductive states, said master portion of the flip-flop having a basic internal bistable element consisting of first and second emitter-follower transistors cross-coupled respectively to first and second holding transistors in a bistable circuit configuration wherein only one of said first and second holding transistors is conducting under static conditions of said J–K flip-flop, and (c) clocking means connectable to a source of clock signals and further differentially connected to said master and slave portions of the flip-flop for holding said master portion of the flip-flop in a fixed conductive state and for enabling the conductive state of the slave portion of the flip-flop to be freely changed by binary signals applied thereto when said clock signals are at a first predetermined logical level, said clocking means further enabling the binary logical levels at said first and second control terminals of the slave portion of the flip-flop to control the conductive state of the master portion of the flip-flop only when said clock signals applied thereto are shifted to a second predetermined logical level; said clocking means holding said slave portion of said flip-flop in a fixed conductive state and simultaneously enabling J and K binary information to be shifted into the master portion of the flip-flop to change the conductive state thereof when said clock signals are at said second predetermined logical level, said binary logical levels existing at said first and second output terminals of the master portion of the flop-flop thereafter being shifted into the slave portion of the flip-flop to change the conductive state thereof when said clock signals return to said first predetermined logical level.

10. The flip-flop according to claim 9 wherein:

(a) said clocking means includes a slave clocking transistor differentially connected to a slave reference transistor between a current sink and the internal bistable element of the slave portion of the flip-flop, said slave reference transistor connected to said first and second holding transistors in the internal bistable element of the slave portion of the flip-flop and holding the slave flip-flop portion in a fixed conductive state when said slave reference transistor is conducting and overriding said slave clocking transistor, and (b) said clocking means further including a master clocking transistor differentially connected to a master reference transistor between a current sink and the internal bistable flip-flop element of the master portion of the flip-flop; said master clocking transistor further connected to said first and second holding transistors in the internal bistable element of the master portion of the flip-flop for holding said bistable element in a fixed conductive state when said master clocking transistor is conducting, whereby clock signals at said first predetermined logical level which are applied simultaneously to said master and slave clocking transistors enable said slave portion of said J–K flip-flop to undergo a change in conductive state and lock said master portion of the flip-flop in its previous conductive state.

11. The flip-flop according to claim 10 wherein said clocking means further includes:

(a) first and second master control transistors differentially connected to said master reference transistor, said first master control transistor further connected to said first control terminal of the slave portion of the flip-flop and said second master control transistor further connected to said second control terminal of the slave portion of the flip-flop, said first and second master control transistors being alternately biased into conduction by the alternate high and low voltage levels at said first and second control terminals of the slave portion of the flip-flop only when said master reference transistor is overriding said master clocking transistor, at which time said slave reference transistor is overriding said slave clocking transistor and the conductive state of the slave portion of the flip-flop is temporarily fixed.

12. The flip-flop according to claim 11 wherein said clocking means further includes:

(a) a second master reference transistor differentially connected to a K input transistor between the internal bistable element of the master portion of the flip-flop and said first master control transistor, one of said second reference transistor and said K input transistor being enabled for conduction when said first master control transistor is conducting, and (b) a third master reference transistor differentially connected to a J input transistor between the internal bistable element of the master portion of the flip-flop and said second master control transistor, one of said third reference transistor and said J input transistor being enabled for conduction when said second master control transistor is conducting.

13. The flip-flop according to claim 12 which further includes bias driver connected across a power supply and having first, second, third and fourth points of diminishing reference potentials which are intermediate the potential of said power supply, said first point of reference potential connected to the second and third master reference transistors for biasing said second and third master reference transistors into conduction when said first and second master control transistors are conducting respectively and the potential at said first point of reference potential is at a level exceeding the J and K binary information applied to the J and K input transistors, said second point of reference potential connected to the slave reference transistor and said third point of reference potential connected to the first-named master reference transistor whereby when clock signals are simultaneously applied to said slave clocking transistor and said master clocking transistor at said first predetermined level of logic, said master clocking transistor will override said first-named master reference transistor prior to the time that said slave clocking transistor overrides said slave reference transistor and thereby insuring that the master flip-flop portion is locked out prior to the time that said slave flip-flop portion is enabled.

14. The flip-flop according to claim 13 which further includes:

(a) set and reset transistors in said slave portion of the flip-flop connected respectively between first and second holding transistors of said slave portion of the flip-flop and said slave clocking transistor, one of said set and reset transistors enabled for conduction when said slave clocking transistor is conducting, thereby imparting to said slave portion of said J–K flip-flop an asynchronous set-reset logic capability, and (b) said J–K flip-flop further including set and reset transistors in the master portion of the flip-flop which are connected in parallel respectively with said first and second holding transistors in the internal bistable element of the master portion of the flip-flop, said set and reset transistors in the master portion of the J–K flip-flop connectable respectively to set and reset binary logic signals which are at a level sufficiently high to bias said master set and reset transistors into conduction substantially simultaneously with the conduction of said set and reset transistors in the internal bistable element in the slave portion of the flip-flop, whereby set or reset signals applied to said master and slave portions of the flip-flop at said first predetermined logical level are capable of asynchronously changing the conductive state of said J–K flip-flop.

15. The flip-flop according to claim 14 which includes a principal master-slave clocking transistor connected in parallel with a master-slave set transistor and a master-slave reset transistor, said master-slave clocking, set and reset transistors connected to receive clocking, set and reset signals respectively for biasing said last-named transistors into conduction, said master-slave clocking, set and reset transistors coupled to said master and slave clocking transistors for conductively controlling said master and slave clocking transistors, said master-slave set and reset transistors adapted to receive set and reset signals which are applied asynchronously with respect to said clock signals for controlling the conductive state of the flip-flop.

16. The flip-flop according to claim 15 wherein first and second slave control transistors are connected in parallel respectively with said set and reset transistors in the slave flip-flop portion and controlled by the output voltage levels at said first and second output terminals of the master portion of the flip-flop when clock signals are at said first predetermined logical level.

References Cited

UNITED STATES PATENTS

| | | | |
|---|---|---|---|
| 2,945,965 | 7/1960 | Clark | 307—291 XR |
| 3,042,815 | 7/1962 | Campbell | 307—291 XR |
| 3,247,399 | 4/1966 | Moody | 307—247 XR |

ARTHUR GAUSS, *Primary Examiner.*

JOHN ZAZWORSKY, *Assistant Examiner.*

U.S. Cl. X.R.

307—269, 289; 328—206